United States Patent
Olkkonen et al.

(10) Patent No.: US 7,792,092 B1
(45) Date of Patent: Sep. 7, 2010

(54) DATA TRANSMISSION METHOD AND A NETWORK ELEMENT

(75) Inventors: Mikko Olkkonen, Kirkkonummi (FI);
Senthil Sengodan, Woburn, MA (US);
Jarno Rajahalme, Kirkkonummi (FI);
Jyri Suvanen, Espoo (FI); Johan Haeggström, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/868,819

(22) PCT Filed: Dec. 23, 1999

(86) PCT No.: PCT/US99/30845
§ 371 (c)(1),
(2), (4) Date: Oct. 4, 2001

(87) PCT Pub. No.: WO00/39970
PCT Pub. Date: Jul. 6, 2000

(30) Foreign Application Priority Data
Dec. 29, 1998 (FI) .................................. 982811

(51) Int. Cl.
*H04L 12/66* (2006.01)
*G06F 15/16* (2006.01)

(52) U.S. Cl. .................................. 370/352; 709/236

(58) Field of Classification Search ............ 709/236, 709/246–247; 370/352–359
See application file for complete search history.

(56) References Cited

U.S. PATENT DOCUMENTS

| 4,707,827 | A | * | 11/1987 | Bione et al. ........... 370/405 |
| 4,958,341 | A | | 9/1990 | Hemmady et al. |
| 5,014,268 | A | * | 5/1991 | Tyrrell et al. ........... 370/374 |
| 5,029,200 | A | * | 7/1991 | Haas et al. ........... 379/88.18 |
| 5,168,498 | A | * | 12/1992 | Adams et al. ........... 370/349 |
| 5,331,631 | A | * | 7/1994 | Teraslinna ........... 370/392 |
| 5,535,199 | A | * | 7/1996 | Amri et al. ........... 370/392 |

(Continued)

FOREIGN PATENT DOCUMENTS

WO  WO 97/28628  8/1997

(Continued)

OTHER PUBLICATIONS

Cisco Systems, Inc., "Understanding TCP/IP", "http://www.cisco.com/univercd/cc/td/doc/product/iaabu/centri4/user/scf4ap1.htm", 1992-2002.*

(Continued)

Primary Examiner—J Bret Dennison
(74) Attorney, Agent, or Firm—Foley & Lardner LLP (57) ABSTRACT

The invention is concerned with transmission of speech information over mixed networks, particularly over a segment using packet transmission in an otherwise circuit switched data transmission network. According to the invention, PCM transmission lines are connected with a packet based network such as an IP network in such a way, that data from one or more channels of a first PCM transmission line is collected in the payload part of a data packet. Further, the destination address of the data packet is constructed in such a way, that the packet network entity being connected to the second PCM transmission line can determine based on the destination address of the packet, to which channel or channels of the second PCM transmission line the data should be transmitted.

25 Claims, 2 Drawing Sheets

U.S. PATENT DOCUMENTS

| | | | |
|---|---|---|---|
| 5,608,786 A | 3/1997 | Gordon | 379/100 |
| 5,610,910 A * | 3/1997 | Focsaneanu et al. | 370/351 |
| 5,796,742 A * | 8/1998 | Klotzbach et al. | 370/466 |
| 5,845,086 A * | 12/1998 | Doebrich et al. | 709/238 |
| 5,867,494 A | 2/1999 | Krishnaswamy et al. | 370/352 |
| 5,949,788 A * | 9/1999 | Friedman et al. | 370/431 |
| 5,978,386 A * | 11/1999 | Hamalainen et al. | 370/466 |
| 6,038,608 A * | 3/2000 | Katsumata | 709/238 |
| 6,044,065 A * | 3/2000 | Andersson et al. | 370/251 |
| 6,049,528 A * | 4/2000 | Hendel et al. | 370/235 |
| 6,065,049 A * | 5/2000 | Beser et al. | 709/218 |
| 6,067,440 A * | 5/2000 | Diefes | 725/27 |
| 6,081,524 A * | 6/2000 | Chase et al. | 370/389 |
| 6,104,717 A * | 8/2000 | Coile et al. | 370/401 |
| 6,167,248 A * | 12/2000 | Hamalainen et al. | 455/403 |
| 6,195,688 B1 * | 2/2001 | Caldwell et al. | 709/208 |
| 6,252,955 B1 * | 6/2001 | Antila et al. | 379/219 |
| 6,324,175 B1 * | 11/2001 | Shiomoto et al. | 370/357 |
| 6,330,614 B1 * | 12/2001 | Aggarwal et al. | 709/236 |
| 6,337,863 B1 * | 1/2002 | Nair et al. | 370/395.63 |
| 6,347,087 B1 * | 2/2002 | Ganesh et al. | 370/392 |
| 6,449,278 B2 * | 9/2002 | Rose | 370/397 |
| 6,457,061 B1 * | 9/2002 | Bal et al. | 709/245 |
| 6,483,833 B1 * | 11/2002 | Jagannath et al. | 370/392 |
| 6,542,501 B1 * | 4/2003 | Tikka | 370/389 |
| 6,581,107 B1 * | 6/2003 | Deac | 709/245 |
| 6,618,762 B2 * | 9/2003 | Fee et al. | 709/245 |
| 6,650,632 B1 * | 11/2003 | Volftsun et al. | 370/352 |
| 6,711,161 B1 * | 3/2004 | Erimli | 370/360 |
| 6,728,238 B1 * | 4/2004 | Long et al. | 370/352 |
| 6,751,209 B1 * | 6/2004 | Hamiti et al. | 370/349 |
| 6,757,286 B1 * | 6/2004 | Stone | 370/395.53 |
| 6,987,756 B1 * | 1/2006 | Ravindranath et al. | 370/352 |
| 7,145,898 B1 * | 12/2006 | Elliott | 370/352 |
| 7,564,840 B2 * | 7/2009 | Elliott et al. | 370/356 |
| 2002/0122425 A1 * | 9/2002 | Gullicksen | 370/395.1 |
| 2004/0017799 A1 * | 1/2004 | Pulkka | 370/352 |
| 2005/0058149 A1 * | 3/2005 | Howe | 370/428 |
| 2005/0152340 A1 * | 7/2005 | Voit et al. | 370/352 |
| 2005/0232246 A1 * | 10/2005 | Dowling | 370/352 |
| 2006/0098635 A1 * | 5/2006 | Ravindranath et al. | 370/352 |
| 2007/0206576 A1 * | 9/2007 | Radulovic | 370/352 |
| 2008/0013531 A1 * | 1/2008 | Elliott et al. | 370/356 |
| 2008/0025295 A1 * | 1/2008 | Elliott et al. | 370/356 |
| 2008/0049726 A1 * | 2/2008 | Iwami et al. | 370/352 |
| 2008/0049727 A1 * | 2/2008 | Iwami et al. | 370/352 |
| 2008/0049728 A1 * | 2/2008 | Iwami et al. | 370/352 |
| 2008/0049729 A1 * | 2/2008 | Iwami et al. | 370/352 |
| 2008/0049730 A1 * | 2/2008 | Iwami et al. | 370/352 |
| 2008/0049732 A1 * | 2/2008 | Gallant et al. | 370/352 |
| 2008/0062973 A1 * | 3/2008 | Wilkes et al. | 370/352 |

FOREIGN PATENT DOCUMENTS

WO        WO 98/44704        10/1998

OTHER PUBLICATIONS

FOLDOC, "X.25", "http://foldoc.org/foldoc/foldoc.cgi?X.25", Aug. 10, 1996.*
C. Yang, "INET Phone: Telephone Services and Servers on Internet" RFC 1789, University of North Texas, Apr. 1995, pp. 1-6.
Office Action dated Jul. 7, 2006 in corresponding EPO Application No. 99 9657 599.4.

* cited by examiner

DATA TRANSMISSION METHOD AND A NETWORK ELEMENT

This is a U.S. national stage of PCT application No. PCT/US99/30845, filed on Dec. 23, 1999. Priority is claimed on that application and on patent application No. 982811 filed in Finland on Dec. 29, 1998.

TECHNICAL FIELD OF TITLE INVENTION

The invention is concerned with transmission of speech information over mixed networks, particularly over a segment using packet transmission in an otherwise circuit switched data transmission network. The invention is directed to a method according to the preamble of claim 1.

BACKGROUND OF THE INVENTION

In conventional telephony, a basic channel format is the 64 kbit/s channel, in which a single speech connection is transmitted. The 64 kbit/s channel transmits 8000 samples per seconds, each sample having 8 bits. Typically, a plurality of 64 kbit/s channels are transmitted in a single transmission line to form 1544 kbit/s, 2048 kbit/, and higher transmission rates. In a 2048 kbit/s transmission link, a 256 bit i.e. 32 byte frame is transmitted 8000 times per second. The 32 groups of 8 bits, i.e. bytes of the frame are referred to as time slots. The terms PCM transmission line and trunk line are commonly used to refer to a communication link transmitting a plurality of 64 kbit/s channels. Therefore, to identify a certain speech channel transmitted within a group of trunk lines, one needs to indicate the time slot number of the channel and a trunk line identifier. The term trunk line is sometimes used also to denote a basic 1544 kbit/s or 2048 kbit/s unit of transmission even in a case, when a plurality of such transmission units are transmitted in a single physical transmission medium i.e. in a single physical transmission line. Although the acronym PCM strictly considered denotes pulse code modulation, which is typically used in trunk lines, the term PCM transmission line is generally used by a person skilled in the art and specifically in this specification to refer to aforementioned logical group of channels or a group of groups of channels and not to a specific modulation method.

Further, packet based transmission networks are presently in widespread use, a prominent example being the Internet. A common packet transmission protocol is the Internet Protocol (IP). The IP protocol version 4 is described in detail in the specification RFC 791. The next version of the IP protocol, known as IPv6, is described in the specification RFC 1883.

The increasing importance and use of telecommunication drives toward interconnection of different types of networks. For example, the Internet is already used for transmitting voice using so called Internet telephony. As the data transmission capacity of the Internet increases, the use of Internet as a replacement of conventional telephones will become common. Some telephone operators already provide long distance calls via the Internet with a reduced rate.

Different schemes for interconnecting cellular telecommunication networks with the Internet are presently under development. The complicity of cellular telecommunication networks and the wide variety of services they provide create new and extensive fields of problems in the interconnection of different networks. One example of a feature unique to cellular telecommunication networks is the compression of speech, which is needed due to limitations of the capacity of the radio interface. A mobile station codes the speech of the user using one of the available codecs, and transmits the resulting coded speech parameters over the radio interface to the base station of the cellular network. The coded speech parameters are decoded back to a speech signal in the cellular network. However, typical compression methods used do not transmit all data in the speech signal, since the compression methods take advantage of the fact, that speech perception of a typical listener is very sensitive to certain features of a speech signal, while being less sensitive, even insensitive to some other features. Therefore, typical compression methods leave out those parts of a speech signal, which are not important to the perceived quality of transmitted speech. However, when coding and decoding is performed more than once, such as in a mobile-to-mobile connection in a cellular telecommunication network, speech quality may be drastically reduced due to the double coding and decoding. This problem can be avoided for example by using the so called tandem free operation (TFO) mode of transmission. In TFO mode, the cellular network element performing the decoding of the coded speech parameters received from the mobile station, inserts the original received coded speech parameteres into the decoded speech signal which is forwarded to the receiver. The speech parameters are typically inserted into the least significant bits of the speech samples of the speech signal, whereby they are perceived as a slight increase of background noise by a receiver of the speech signal, if the receiver does not utilize the embedded speech parameters. In case of a mobile to mobile TFO mode call, the network element at the receiving end performing the encoding of the speech signal for transmission to the receiving mobile station extracts the embedded speech parameters, and transmits those to the mobile station without performing a second coding operation. The receiving mobile station then decodes the speech parameters into a speech signal. In the TFO mode, a speech signal is coded only once, i.e. in the transmitting mobile station, and the receiving mobile station receives the coded speech parameters prepared by the transmitting mobile station, whereby double coding is avoided. This significantly improves the speech quality because without TFO, the original speech signal is coded twice with the lossy speech compression algorithm which degrades the speech quality each time the compression is applied. The difference between the single encoding and the tandem encoding becomes even more important when the bit-rate of a speech codec is very low. The old high bit-rate speech coding standards, as exemplified by the G.711 standard of 64 kbits PCM coding, are very robust to successive coding. However, the state of the art speech coders operating in a range of 4 kbits to 16 kbits are quite sensitive to more than one successive coding.

A number of problems arises when different types of transmission networks participate in transmission of connections, especially when different connections have different parameters such as the data transmission rate and whether compression is used or not. One problem, for example, is how to optimize the data transmission in the case, when some of the data transmission channels are compressed and some transmission channels are not compressed. A further problem is how to efficiently connect PCM transmission lines with an packet based network such as an IP network.

SUMMARY OF THE INVENTION

An object of the invention is to realize a transmission method, which allows the use of packet based networks in transmission of circuit switched connections. An object of the invention is also to provide a way for connecting two PCM transmission lines with a packet based network such as an IP or an X.25 network. A further object of the invention is to provide such a method, which allows the transmission of both compressed and noncompressed traffic. A still further object of the invention is to provide such a method, which optimizes the use of data transmission capacity for both compressed and noncompressed traffic.

The objects are reached by inserting a number of samples from at least one channel of a PCM transmission line into the payload part of a data packet, and indicating the destination PCM transmission line and the channel within the transmission line in the destination packet address.

The method according to the invention is characterized by that, which is specified in the characterizing part of the independent method claim. The network element according to the invention is characterized by that, which is specified in the characterizing part of the independent claim directed to a network element. The dependent claims describe further advantageous embodiments of the invention.

According to the invention, PCM transmission lines are connected with a packet based network such as an IP or an X.25 network in such a way, that data from one or more channels of a first PCM transmission line is collected in the payload part of a data packet. Further, the destination address of the data packet is constructed in such a way, that the packet network entity being connected to the second PCM transmission line can determine based on the destination address of the packet, to which channel or channels of the second PCM transmission line the data should be transmitted.

BRIEF DESCRIPTION OF THE DRAWINGS

The invention is described in more detail in the following with reference to the accompanying drawings, of which FIG. 1 describes a method according to an advantageous embodiment of the invention.

Same reference numerals are used for similar entities in the figures.

DETAILED DESCRIPTION

A. An Example of Transmission of a TFO Mode Channel

In one advantageous embodiment of the invention, the processing is performed by a network element connected to one or more PCM data transmission lines and a IP network. Such a network element is hereafter referred to as a packet network gateway. The packet network gateway receives 64 kbit/s data transmission channels from the PCM data transmission lines. Each of these 64 kbit/s channels may transmit for example speech or a data or a fax transmission. The PCM transmission line is connected to a network element of a cellular telecommunications network, such as a MSC (mobile services switching center) of a GSM or a UMTS network. In this example, the processing of a TFO mode call is described. In a TFO mode call, the 64 kbit/s speech signal comprises in addition to the speech signal itself, the compressed speech information in the least significant bits of the speech signal. In this example, the packet network gateway extracts the compressed speech information from the incoming signal. The packet network gateway collects a predetermined amount of this compressed speech information, for example a certain amount of bits corresponding to an amount of bytes, which amount of bytes is large enough for efficient transmission and small enough for not producing a too large packetizing delay. When the predetermined amount of speech parameter information is collected, the information is inserted in an IP packet, which is given a destination address corresponding to the packet network gateway associated with the destination MSC. The packet is then transmitted through the IP network to the destination packet network gateway.

The destination packet network gateway then receives the packet and extracts the speech parameter information from the packet. Next, the destination packet network gateway creates a speech signal according to the speech parameter information, and embeds the speech parameter information in the lowermost bits of the speech signal as in conventional TFO mode. The resulting signal is then sent to a 64 kbit/s PCM channel towards the destination MSC.

B. Channel Identification Information

In an advantageous embodiment of the invention, the channel information identifying the PCM channel at the receiving end is included in the packets of the packet network such as an IP or a X.25 network. In the following, an example of an embodiment of the invention as applied in an IP network is described. The channel identification information may for example be defined by the destination IP address, or be included in the IP datagram in an extra option field or in the data part of the datagram.

In such an embodiment, in which the destination IP address defines the channel identification information, a predefined rule may be used for generating the IP address and deducing the channel identification information from the IP address. For example, the 64 kbit/s channels in the PCM transmission line connected to the destination packet network gateway may be numbered consecutively, in which case the IP address of a channel can be found by adding the number of the channel to the base address of the packet network gateway. This is only one example of a rule, and does not limit the invention in any way, since many other types of rules may be used in various embodiments of the invention. For example, the time slot numbers of the channels may be used as well. If the packet network gateway is connected to more than one 2048 kbit/s PCM trunk line, the trunk lines may be numbered consecutively, in which case the IP number may be derived from both the time slot number and the trunk line number. For example, the following equation may be used:

IP address=base address+($N_{TS}$·trunk line number)+ time slot number

The term $N_{TS}$ denotes the number of time slots in one frame of the trunk line.

A 1544 kbit/s PCM trunk line has 24 time slots, whereas a 2048 kbit/s PCM trunk line has 32 time slots. For example, if a packet network gateway has as its base address 1.313.42.100, the IP addresses of 32 time slots of a first 2048 kbit/s trunk line would then be 1313.42.100 to 1.313.42.131 and addresses of the time slots of a second 2048 kbit/s trunk line would then be 1.313.42.132 to 1.313.42.163, assuming that the numbering of time slots and trunk lines starts with zero. The opposite procedure, i.e. computing the trunk line number and the time slot number, can be done for example according to the following equations:

time slot number=(IP address−base address)MOD $N_{TS}$ trunk line number=$INT$((IP address−base address)/ $N_{TS}$)

where the function m MOD n is the modulo function, and the function INT(x) returns the integral part of x. The man skilled in the art knows many other straightforward ways how to proceed in the opposite way, i.e. how to compute the time slot number and the trunk line number from the IP address, when the base address is known. Therefore, these ways are not described here in further detail.

The invention is not limited to the previous example of forming the IP address corresponding to a channel, since many other IP address forming rules can be used. For example, in a further advantageous embodiment of the invention, the IP address is formed by concatenating the time slot number to a prefix value associated with the packet network gateway.

The previous addressing examples require that the necessary address space, i.e. one IP number per channel is available. In an IPv6 network this should not be a problem. On the other hand, an IPv4 network might not have enough free addresses. In such an embodiment it is desirable, that the channel identification information is specified in some other way than through the IP address. As previously mentioned, the channel identification information may also be encoded in an extra options field in the header of the IP datagram, or preferably, in a predefined way in the data part of the IP datagram.

In a further advantageous embodiment of the invention, the channel identification information at the sending packet network gateway is included in the IP datagram. The channel identification information can be specified in the form of an IP address for example according to previous examples, which address is used as the sender's IP address in the IP datagram. The channel identification information may also be encoded in an extra options field or in the data part of the IP datagram in a predefined way.

C. Combining of Multiple Channels

In further advantageous embodiments of the invention, speech data from more than one channel is transmitted in one datagram of the network level protocol such as the IP or the X.25 protocol. One datagram may contain data for example from a plurality of consecutive time slots, or from a plurality of at least partly non-consecutive time slots. Some examples of such embodiments are presented in the following paragraphs.

C.1. Consecutive Channels

In an advantageous embodiment of the invention, data from all time slots of one or more consecutive frames are sent in one datagram of the network level protocol such as the IP or the X.25 protocol. For example, a frame of a 2048 kbits PCM line contains 32 time slots. Since each time slot contains 8 bits, one frame corresponds to 32 bytes of payload in an IP datagram, if no compression is used. For example, if 32 consecutive frames are sent in one IP datagram, the IP datagram would have 1024 bytes of uncompressed speech data. However, packing of 32 consecutive frames i.e. 32 samples from each of 32 channels introduces a 4 ms packetizing delay. To obtain shorter delays, frames can be collected from more than one PCM trunk lines. For example, collecting 16 consecutive frames from each of two 2048 kbit/s PCM lines i.e. 16 samples from each of 64 channels, would result in the same amount of data, but only in a 2 ms delay.

In a further advantageous embodiment of the invention, one or more of the plurality of consecutive channels can be transmitted in compressed form. This can be realized for example by adding status information of the transmitted channels to the IP packet. The status information can for example comprise four bits per channel. One of these bits can denote the active/inactive status of the channel, and three of these bits can indicate the number of bits used for transmission of the particular sample of the channel. For example, if a channel is transmitted uncompressed, the sample length would be 8 bits. If a channel transfers compressed speech parameters, three bits may be enough to represent a sample of the compressed speech signal, depending on the compression method used. If the channel is inactive, no bits need to be used to transmit that channel. In the example of 16 samples from 64 channels being packed in one IP datagram, 64 times 4 bits i.e. 32 bytes of status information needs to be inserted in the datagram. This embodiment has the advantage, that while the capacity savings brought about by compressed traffic can be obtained, uncompressed and mixed traffic can be transmitted using the same mechanism. Preferably, the destination IP address and the sender IP address are used to indicate the PCM trunk line or lines, whose data is carried by the datagram. The position of each sample in the datagram specifies the time slot i.e. channel corresponding to the sample.

Preferably, information about the number of channels transferred by an IP datagrams is included in the datagram, for example in the beginning of the channel status information header described in the previous paragraph.

C.2 Nonconsecutive Channels

A further advantageous embodiment of the invention provides for transmission of data from nonconsecutive time slots in a single datagram. Such an embodiment can be realized by inserting status information into the datagram, which status information in this embodiment can comprise for example five bits for each time slot: one bit indicating whether the channel is active or inactive, three bits indicating the length of the samples of the channel, and one bit indicating whether channel information is defined by the datagram or not. Thereby the header can indicate separately for each time slot, whether the datagram carries the corresponding channel or not. If the datagram does not carry the corresponding channel, the receiving packet network gateway can receive data to that channel from other sources from the IP network. This embodiment allows the transmission of any number of time slots from one frame, regardless of whether they are consecutive or not. This embodiment has the advantage, that different time slots of a single PCM trunk line can receive data from different packet network gateways. For example, a first packet network gateway may send data to time slots 5 to 10 of a 2048 kbit/s PCM trunk line at a second packet network gateway, while a third packet network gateway may send data to the rest of the time slots of the same PCM trunk line. Further, this embodiment allows the destination packet network gateway to receive a group of channels from another packet network gateway, and single channels separately from one or more other sources, such as IP telephones.

C.3 IP Address Determination in Case of Multiple Channels

The IP address determination can be performed in roughly similar way as in the case of a single channel being transferred in an IP datagram. The IP address may be advantageously determined based on the time slot number of the first time slot, whose data is transferred in the datagram, and the time slot for each of the rest of the data samples in the datagram is specified by its position relative to the first time slot.

D. Selection of Coding Mode

In some advantageous embodiments of the invention, the packet network gateway does not perform any coding mode negotiations with other network elements. In such embodiments, the packet network gateway transparently transfers uncompressed channels, and transmits through the packet network only the compressed speech parameters for any TFO mode signals present. However, in other embodiments of the invention, the packet network gateway can take part in coding mode negotiations between various network elements, and two packet network gateways can negotiate about compression modes to be used between them. Such functionality brings considerable advantages for example when different types of communication networks are connected using a packet network. Some exemplary embodiments of the invention, in which packet network gateways perform or participate in coding mode decisions and negotiations are described in the following paragraphs.

In one advantageous embodiment, a first packet network gateway is connected to a cellular telecommunications network such as a GSM network or an UMTS network, and a second packet network gateway is connected to a conventional telephone system. In such a case, the first and second packet network gateways can negotiate to select the same coding mode for a connection, which is used by the mobile station of the cellular telecommunications network. Consequently, the connection can be treated by the cellular telecommunications network as a TFO connection. The first packet network gateway simply transmits the compressed speech parameters to the second packet network gateway as described previously, and the second packet network gateway compresses the speech signal from the conventional telephone network, before transmission of the compressed signal to the first packet network gateway and the cellular telecommunications network. Further, in this case the second packet network gateway does not need to embed the compressed speech parameters in the decompressed speech signal sent to the conventional telephone network, since most likely the compressed speech parameters would not be used in any way in the conventional telephone network.

In a further advantageous embodiment of the invention, an packet network gateway can in addition to coding implement other conventional features used typically in cellular telecommunication systems to reduce data transmission, such as discontinuous transmission. In such an embodiment, a voice activity detector of the packet network gateway monitors the transmitted speech signal, and if no voice activity is detected, no data is transmitted over the packet network. Preferably, silence descriptor information is transmitted before a transmission pause, in order to enable the receiving packet network gateway to generate comfort noise.

In one exemplary embodiment of the invention, in which a mobile-to-mobile call is routed from one MSC via a first packet network gateway, a packet network, and a second packet network gateway to a second MSC, the coding mode negotiations can be performed for example as follows. During call set up, TFO connections are first set up between the transcoder unit and the packet network gateway at both ends, after which the packet network gateways negotiate the coding mode between them. If the same coding mode was selected at both ends, the establishment of the connection can be continued. If different coding modes were selected, one of the packet network gateways can renegotiate the coding mode selected at the corresponding end of the connection. Alternatively, one of the packet network gateways can perform transcoding, i.e. conversion between the coding modes.

In a further advantageous embodiment of the invention, two packet network gateways can negotiate between themselves about compressing a signal transmitted between them, even if the systems at either end of the connection do not use or support compression. Preferably this is performed only in the case that during call set up, the packet network gateways receive information indicating that the call is a speech connection, and not a data or a fax call.

E. Protocols

In a further advantageous embodiment, a higher level transmission protocol is used on top of the packet network level protocol between the two communicating packet network gateways. For example, the IP protocol does not guarantee delivery of data, and the IP protocol has no mechanisms for replacement of faulty or missing datagrams. Neither does the IP protocol guarantee the correct receive order of datagrams. Therefore, a second protocol is advantageously used on top of the packet network level protocol such as the IP or the X.25 protocol to enhance the reliability of data transmission between the packet network gateways. In such an embodiment of the invention, the data is inserted in a packet of the higher level protocol, after which the packet of the higher level protocol is inserted into one or more packet network level protocol datagrams for transmission over the packet network. The packet network gateways execute the higher level protocol, generating messages and replying to messages as required by the specifications of the particular protocol. However, it is also possible in other embodiments of the invention to implement the execution of the higher level protocols using a separate network element between an packet network gateway and the packet network.

If the packet network gateway receives a packet network level protocol datagram addressed to an address within the plurality of addresses managed by the packet network gateway, and which datagram does not contain data which the packet network gateway recognizes as valid speech data and does not contain any messaging data pertinent to a protocol used in the transmission of the speech data, the packet network gateway preferably discards the packet.

In one embodiment of the invention, the well known TCP protocol (Transmission Control Protocol) is used. However, the TCP protocol is not very well suited for real time transmission, wherefore other protocols are preferred. A further alternative is the UDP protocol (User Datagram Protocol) or the RTP protocol (Real Time Protocol), which is designed for transmission of real time data. The TCP protocol is defined by the specification RFC 791, UDP by RFC 768, and RTP by RFC 1889. Other suitable protocols are the PPP protocol (Point-to-Point Protocol) defined in RFC 1661, PPP protocol in HDLC-like framing as defined in RFC 1662, or the V.110 or V.120 protocols.

Further, more than two protocols can be used on top of each other. For example, the RTP protocol is preferably used on top of the UDP protocol, which is used on top of the IP protocol.

These protocols are well known by a man skilled in the art, wherefore they are not described in further detail in this specification.

F. An Example of a Method

Figure 1:
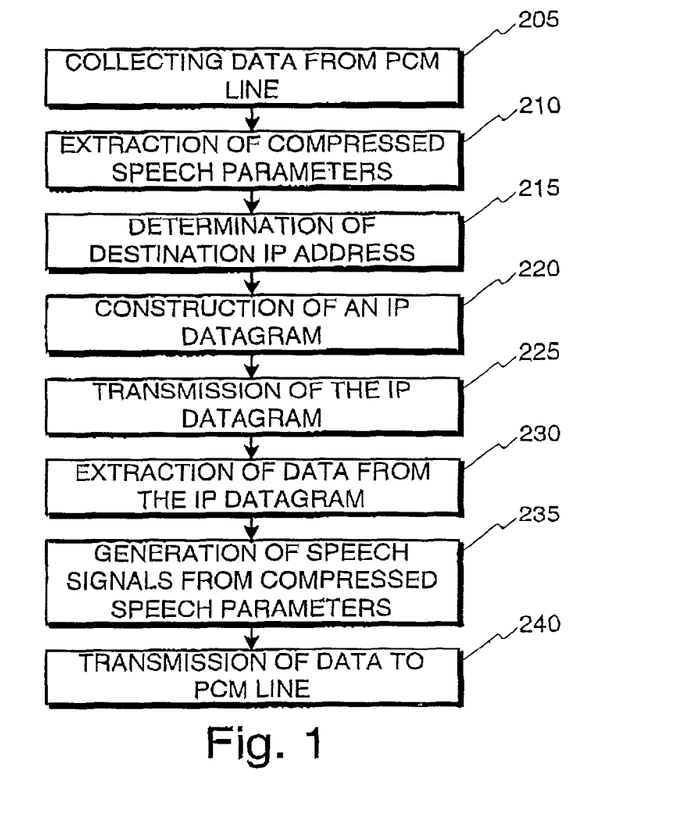

FIG. 1 illustrates a method according to an advantageous embodiment of the invention for transmission of data arriving from a PCM transmission line through an IP network to another PCM transmission line. First, in step 205, data is collected from the PCM line, from one or more channels i.e. time slots. If any of the channels contains a TFO mode signal, the compressed speech parameters are extracted from the data at step 210. In the following step 215, the IP address for the IP datagram is determined for example in some of the ways described previously.

Preferably, the IP address is stored in a memory means for later use. Thereafter, when another IP datagram containing data from the same channel or channels is to be sent, the determination step 215 can simply comprise fetching of the previously determined IP address from the memory means.

In the following step 220, the IP datagram is constructed, whereafter the datagram is transmitted through the IP network in step 225. After the destination packet network gateway receives the datagram, it extracts the data samples from the datagram in step 230. In case that the data contains compressed speech parameters, the compressed speech parameters are decompressed to speech signal data in step 235. In the next step, the received and/or decompressed data are sent to corresponding channels of the PCM line connected to the destination packet network gateway.

The method shown in FIG. 1 is only an example of an embodiment of the invention. The invention can be realized in many other ways as well. For example, the ordering of steps 210, 215, and 220 can be different from that shown in FIG. 1 in various embodiments of the invention.

G. An Example of a Network Element

Figure 2:
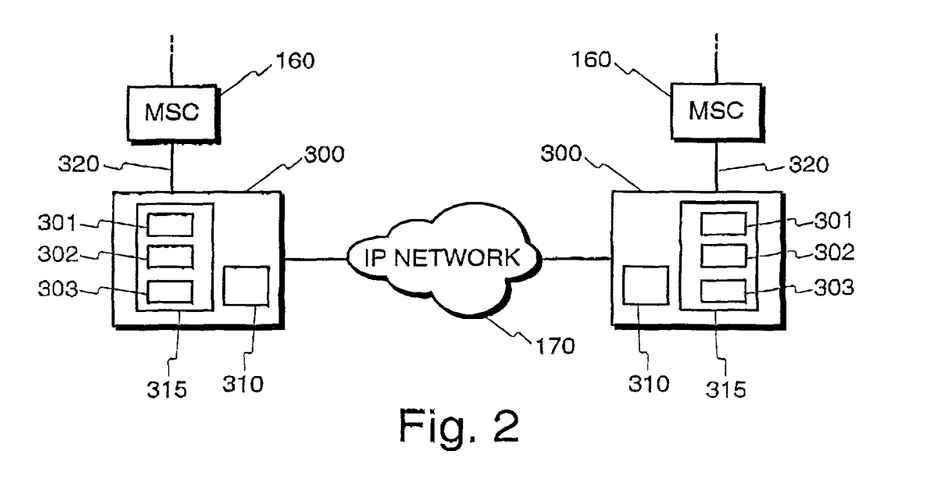
FIG. 2 illustrates a network element according to an advantageous embodiment of the invention.

FIG. 2 illustrates one example of an embodiment of the invention, in which the inventive functionality is realized in a network element 300 located between a MSC 160 and a IP network 170. The network element preferably comprises a processor unit 310 such as a digital signal processor 310 for realizing the functions of the network element. For example, the network element may comprise an IP address generating unit 301 for generating IP addresses for IP packets based at least partly on parameters identifying at least one channel of the PCM transmission line. Further, the network element may comprise a compressed speech parameter extraction unit 302 for extracting compressed speech parameters from at least one signal from the PCM transmission line, which signal comprises both an uncompressed speech signal part and compressed speech parameters. The network element may also comprise a compression unit 303 for compressing the signal of at least one channel from the PCM transmission line before transmission over the data transmission network. The address generating unit 301, speech parameter extraction unit 302 and the compression unit 303 may advantageously be realized using software programs executed by the processing unit 310 stored in a memory means 315 in the network element 300.

H. Call Set-Up

The information about the packet network level protocol address of the destination packet network gateway can be obtained by the sending packet network gateway for example during call set up. In the following, one example of call setup signalling according to an advantageous embodiment of the invention as applied to an IP network is described. In this embodiment, the switching centers supporting IP traffic are implemented in such a way, that they return an IP address instead of a conventional E.164 telephone number as a response to a routing info request from another switching center.

In this example, it is assumed that switching centers having IP traffic capability can be recognized by the telephone numbers corresponding to the SC:s. The switching centers may for example have a database specifying which other switching centers support IP traffic.

In this example, messaging between switching centers (SC) A and B is described. In the case of a cellular telecommunications network, the two switching centers can be mobile services switching centers (MSC:s).

When a subscriber makes a call, SC A receives a SETUP message of the ISUP protocol. The SETUP message comprises the number of the other party, which the subscriber wishes to call. Switching center A examines the number, and if the analysis of the digits implies that SC B can receive IP traffic, SC A interrogates SC B by sending e.g. a "Send Routing Info" command to SC B using the signalling system SS7. Upon receiving the command, SC B locates a free incoming channel in the transmission line between SC B and its local packet network gateway, generates an IP address corresponding to the channel, and sends the IP address back as a response to the command. When SC A receives the IP address, it switches the connection to the packet network gateway associated with SC A, and sends the IP address to the packet network gateway to be used as the destination IP address. The packet network gateway of SC B can subsequently obtain the IP address of the channel in the packet network gateway of SC A from the source IP address of IP datagrams sent by the packet network gateway of SC A.

The interrogation command mentioned in the previous paragraph can be specific to IP traffic supporting switching centers, in which case a SC receiving such an interrogation command always knows that the sender of the command also supports IP traffic. Consequently, a SC can always reply to such a command by sending an IP address instead of an E.164 telephone number. According to another embodiment of the invention, a second switching center receiving such an interrogation command from a first switching center examines information identifying the first switching center, e.g. the telephone number of the calling party. If the telephone number identifies that the first switching center supports IP traffic, the second SC can reply by sending an IP address. Otherwise, the second SC replies in the conventional way by sending an E.164 telephone number.

I. Further Advantageous Embodiments of the Invention

In a further advantageous embodiment, the packet network gateways also comprise functionality necessary for transcoding between various encoding modes. Such a functionality in addition to the previously described negotiation functions are in the present embodiment used for optimizing of the number of transcodings within the transmission path.

In the present embodiment, the object of minimization is the number of transcodings, if any, in the end-to-end transmission path. For obtaining this aim, a special ordering is used in the messages transmitted between the various network elements for describing the capabilities of the elements regarding supported coding modes. Such messages are often called terminal capability set (TCS) messages. Such messages typically list the coding modes which the sender of the message can receive and which ones the sender can transmit. In this application, the item describing a coding mode is denoted a capability descriptor, a term which is also used for this purpose in some specifications of cellular telecommunication systems. The available coding modes may be different for different directions. In the present inventive embodiment, the order in which the capabilities is listed in a terminal capability set message is given significance, i.e. the listing order signifies an order of preference.

The order of the capability descriptors is defined by certain set of rules, which the network elements follow when transmitting a terminal capability set message to the next network element along a transmission path. Basic considerations for these rules are the following:

Those coding modes, which the previous network node supports and which the current network node supports, have highest preference. Preferably, the current network node maintains the preference order of the previous network node if the following considerations do not require a change in the order, and at least partially, if the order needs to be changed.

After these, those coding modes have the next highest preference, which coding modes the previous network node does not support, but which coding modes are supported by the current network node, and for which modes the current network element can act as a transcoder, transcoding to/from a coding mode supported by the previous network node.

Symmetrical encodings are preferred over asymmetrical encodings. In symmetrical encoding, the same codecs are used for transmission and for reception.

Figure 3:
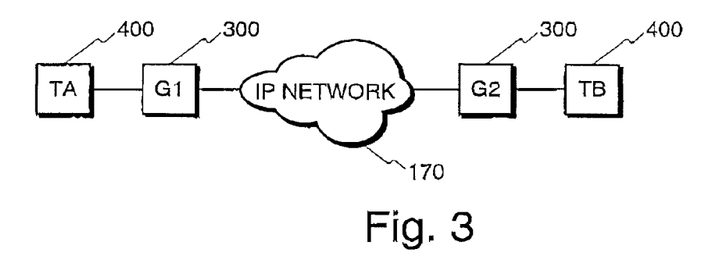
FIG. 3 illustrates a further advantageous embodiment of the invention.

As an example, let us consider the flow of TCS messages in a network as shown in FIG. 3. FIG. 3 shows schematically a first terminal TA 400, a first packet network gateway G1 300, a packet network 170, a second packet network gateway G2 300, and a second terminal. TB 400. Let us consider a situation, in which the first terminal TA communicates its capabilities to the other terminal TB. Similar procedure applies in the reverse direction, but for, clarity, we discuss here only the direction from TA to TB.

First, the terminal TA transmits a TCS message to G1, listing the capability descriptors in a desired order of preference.

Next, the first gateway G1 receives the message, and prepares a new TCS message for transmission to gateway G2. Gateway G1 arranges the capability descriptors in the following way:

those capability descriptors which TA sent and which G1 is capable of supporting form a first set of capability descriptors among these capability descriptors in the first set, the capability descriptors of symmetrical coding modes form a second set, while the rest of the capability descriptors of the first set form a third set the second set is ordered in the same order in which these capability descriptors were in the TCS message received by G1 the third set is ordered in the same order in which these capability descriptors were in the TCS message received by G1 a fourth set of capability descriptors is formed by those capability descriptors, which correspond to reception coding modes supported by G1 and not supported by TA, but which modes the gateway G1 can receive and which modes G1 can transcode to a coding mode supported by TA a fifth set of capability descriptors is formed by those capability descriptors, which correspond to transmission coding modes supported by G1 and not supported by TA, but which modes the gateway G1 can transmit and to which G1 can transcode from a coding mode supported by TA.

The TCS message transmitted by the G1 then comprises the second, third, fourth and fifth sets of capability descriptors, in that preference order. However, the order of the fourth and fifth sets can also be the other way around.

Next, the second gateway G2 receives the message, and prepares a new TCS message for transmission to the second terminal TB. Gateway G2 arranges the capability descriptors in the following way:

those capability descriptors which G1 sent and which G2 is capable of supporting form a first set of capability descriptors among these capability descriptors in the first set, the capability descriptors of symmetrical coding modes form a second set, while the rest of the capability descriptors of the first set form a third set the second set is ordered in the same order in which these capability descriptors were in the TCS message received by G2 the third set is ordered in the same order in which these capability descriptors were in the TCS message received by G2 a fourth set of capability descriptors is formed by those capability descriptors, which correspond to reception coding modes supported by G2 and not supported by G1, but which modes the gateway G2 can receive and which modes G2 can transcode to a coding mode supported by G1 a fifth set of capability descriptors is formed by those capability descriptors, which correspond to transmission coding modes supported by G2 and not supported by G1, but which modes the gateway G2 can transmit and to which G2 can transcode from a coding mode supported by G1.

The TCS message transmitted by the G2 then comprises the second, third, fourth and fifth sets of capability descriptors, in that preference order. However, the order of the fourth and fifth sets can also be the other way around.

Finally, the second terminal TB receives the TCS message from gateway G2, and preferably selects for reception a coding mode which it can receive, and of those coding modes, the one having the highest preference.

One natural way of listing the capability descriptors is that the most preferred capability descriptor is listed first of all capability descriptors in the terminal capability set message, and following the most preferred one, the other ones in a decreasing order of preference. As a man skilled in the art perceives, the correspondence of the listing order and the preference order can also be defined the other way around.

Figure 4:
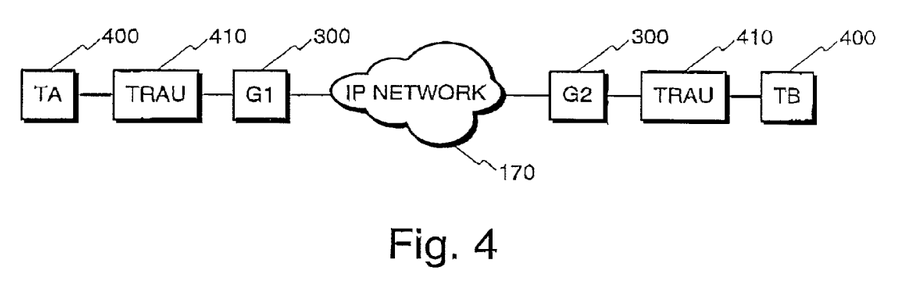
FIG. 4 illustrates a still further advantageous embodiment of the invention.

FIG. 4 illustrates one configuration of the transmission path according to an advantageous embodiment of the invention. This embodiment illustrates the possibility, that more than two network element within the transmission path have transcoding capability, i.e. can take part in negotiating and effecting TFO mode operation. In this embodiment, the terminals TA and TB 400 are mobile communication means. The speech data in this example traverses from one terminal through a TRAU (Transcoder and Rate Adaptor Unit) 410 to a packet network gateway 300, and through the packet data network 170 to another packet network gateway 300 and TRAU 410, and finally to the other terminal 400. In this embodiment, both gateways G1, G2 and both TRAU units 410 have transcoding capability. The ordering scheme according to preference described in relation to FIG. 3 is used also in this embodiment. The previously described scheme for ordering the capability descriptors in the terminal capability set messages ensures, that if there is at least one coding mode supported by all of these network elements having transcoding capability, such a coding mode will be selected for transmission of speech data. Further, the previously described scheme also minimizes the number of transcodings, if one common transcoding mode cannot be found.

Since the preference order is carried within the TCS message, no other signalling about the preference order needs to be performed in order to optimize the transmission.

Figure 5:
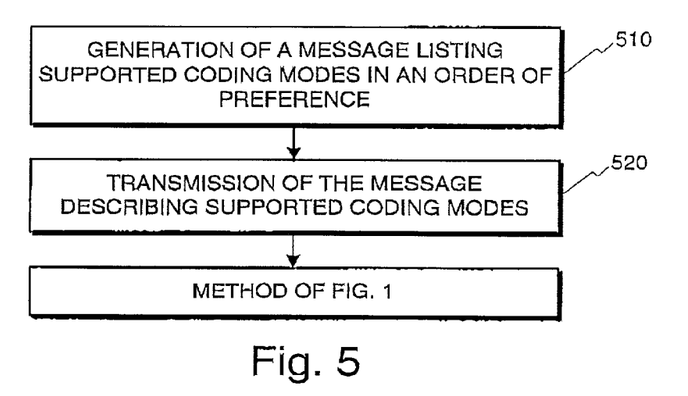
FIG. 5 illustrates a method according to an advantageous embodiment of the invention.

FIG. 5 illustrates a method according to an advantageous embodiment of the invention. FIG. 5 illustrates steps during connection setup phase, when terminal capability set messages are sent. According to this embodiment, a message listing supported coding modes in an order of preference is generated 510. Next, the message listing supported coding modes is transmitted from a network element to the next network element in the transmission path. After these steps, other steps necessary for setting up a connection can advantageously be performed, before beginning the transmission of actual speech data. Transmission of speech data can for example be performed according to the method shown in FIG. 1.

J. Further Considerations

The invention has several advantages. For example, the collection of data from a plurality of channels to a single data packet reduces the packetizing delay for a single channel, i.e. the time needed for collecting enough samples for filling the data packet. Consequently, the size of the packets can be large, which assists in optimization of the effectivity of data transfer over the packet network, without the large size of the packets increasing the packetizing delay by an inordinate amount. Further, the number of packet connections can be lower than the number of transmitted channels, which reduces the amount of transmission overhead per a transmitted channel.

The packet network may be in various embodiments of the invention for example an internal network of a building or an organization, i.e. an intranet, or a large network, such as the world-wide Internet network. The invention is not limited to any specific packet network. The packet network may for example be a network employing the IP protocol, the X.25 protocol, or for example the CLNP (Connectionless Network Protocol) protocol as the network level protocol.

A single MSC can in various embodiments of the invention be connected to more than one packet network gateway. Also, the functionality of more than one packet network gateway may be realized within a single MSC.

As described in the prior art, the term PCM transmission line is used in this specification to refer to a transmission line, which comprises a plurality of channels. The transmission line may be for example a 2048 kbit/s trunk line or a 1544 kbit/s trunk line, or a higher level line comprising a plurality of such trunk lines. The invention is not limited to any specific transmission line type. The term PCM transmission line is used only as an example of a transmission line with the intention of presenting an as clear description of the invention as possible, which term is well known by a person skilled in the art and which term is commonly used for a general transmission line in the jargon of the art. However, for reasons of clarity and accuracy the term circuit switched transmission line is used in the claims for denoting such a transmission line comprising a plurality of channels. Correspondingly, a channel of such a transmission line is in the claims referred to as a circuit switched channel.

In various embodiments of the invention, the previously described functionality described as associated with a packet network gateway can be realized using also other network elements as a packet network gateway. For example, the creation of data packet payloads comprising data from compressed data channels can also be realized in a transcoder unit (TRCU), which converts channels from a 16 kbit/s channel used in a base station subsystem (BSS) to a 64 kbit/s channel, which is the basic transmission channel handled by a MSC. Since transcoder units typically participate in the TFO mode negotiations, the creation of data packet payloads comprising compressed data in the transcoder units would simplify the arrangements necessary for the TFO mode negotiations, i.e. could even remove the need of packet network gateways to participate in the TFO mode negotiations.

Most of the packet network gateway functionality may as well be implemented in the TRCU. In such an embodiment, the TRCU creates the data packets and forwards the data packets to the MSC in a normal circuit switched connection. The MSC switches the signal to a network element of the packet network. This network element extracts the packets from the circuit switched data stream and sends them forward in the packet network layer protocol format as described previously. In such an embodiment, the TRCU can create also higher level protocol structures used in the transmission of data over the packet network, i.e. for example PPP protocol structures carried in network level protocol packets.

Previously, some examples were presented of a predefined rule for generating an IP address based on PCM channel information. In an advantageous embodiment of the invention, network elements participating in the data transmission negotiate between themselves, which rule will be used. Advantageously, the negotiation may be performed between the packet network gateways. In a further advantageous embodiment of the invention, the rule is negotiated by the MSC:s connected to the packet network gateways.

The name of a given functional entity, such as the base station controller, is often different in the context of different cellular telecommunication systems. For example, in the UMTS (Universal Mobile Telecommunication System) system the functional entity corresponding to a base station controller (BSC) is the radio network controller (RNC). Therefore, the particular terminology used to denote various functional entities in this specification are only examples according to the GSM system, and do not limit the invention in any way.

The invention can be used in many different cellular telecommunication systems, such as the GSM or the UMTS systems.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. A method, comprising:
transmitting data over a data transmission network from a first circuit switched transmission line through a first circuit switched network node towards a second circuit switched network node that is coupled to a second circuit switched transmission line;
employing, in the data transmission network, an IP protocol for transmissions from said first circuit switched network node, which receives data from said first circuit switched transmission line, towards said second circuit switched network node, said data being destined for transmission into said second circuit switched transmission line;
using an IP protocol datagram to transmit data received from the first circuit switched transmission line towards the second network node;

forming a header for said IP protocol datagram based at least partly on circuit switched channel identifying parameters, which identify at least one channel in the second circuit switched transmission line, and an IP protocol address of the second network node; and indicating within said IP protocol datagram separately for each of a plurality of time slots known to at least one of said first and second circuit switched network nodes, whether the IP protocol datagram carries data belonging to a channel corresponding to the time slot, and when it is indicated that the IP protocol datagram does not carry data belonging to the channel, the second circuit switched network node enables the reception of data to that channel from other sources from an IP-network in a non-consecutive manner.

2. The method according to claim 1, wherein data from at least one channel of the first circuit switched transmission line is transmitted as compressed data over the data transmission network.

3. The method according to claim 2, wherein only compressed speech signal parameters of a signal received from said at least one channel of the first circuit switched transmission line are transmitted over the data transmission network; wherein said received signal comprises an uncompressed speech signal part and compressed speech parameters.

4. The method according to claim 2, wherein the received signal of said at least one channel of the first circuit switched transmission line is compressed in the first network node.

5. The method according to claim 1, wherein samples of data from more than one channel of the first circuit switched transmission line are transmitted over the data transmission network in one IP protocol datagram.

6. The method according to claim 1, further comprising:
transmitting a message which describes supported coding modes for compressed speech parameters from the first circuit switched network node to the second circuit switched network node, and
describing said supported coding modes in said transmitted message in an order of preference for optimizing speech data transmission.

7. The method according to claim 1, further comprising: inserting status information into the datagram.

8. The method of claim 7, wherein said status information comprises at least an indicator to indicate activity of the at least one channel, a length of samples of the at least one channel and whether channel information definition is comprised in the IP protocol datagram.

9. The method according to claim 1, wherein said forming of a header for said IP protocol datagram is based at least partly on a time slot number that at least one of said first and second network nodes knows is associated with data which is transferred in the IP protocol datagram.

10. The method according to claim 1, further comprising:
inserting a number of samples from at least one channel of said first transmission line into a payload portion of said IP protocol datagram.

11. The method of claim 1, wherein the method comprises transmitting the number of time slots in the corresponding frame.

12. The method of claim 1, wherein a first packet network gateway acts as said first circuit switched network node and sends data to a second packet network gateway that acts as said second circuit switched network node, and said first packet network gateway uses headers of transmitted IP protocol datagrams to identify time slots 5 to 10 of a PCM trunk line operating at least the rate 2048 kbit/s as destinations of transmitted data at said second packet network gateway.

13. The method of claim 12, wherein a third packet network gateway is arranged to send data to the second packet network gateway and to use headers of transmitted IP protocol datagrams to identify the rest of the time slots of the same PCM trunk line as destinations of data transmitted from said third packet network gateway to said second packet network gateway.

14. A network element, comprising:
a first connection for connecting to a first circuit switched transmission line;
a second connection for connecting to a data transmission network employing an IP protocol, and
a hardware processor configured to implement an IP protocol address generating unit for generating IP protocol addresses for IP protocol datagrams to be transmitted over said data transmission network to a second network element;
wherein said IP protocol address generating unit is configured to form a header of an IP protocol datagram based at least partly on circuit switched channel identifying parameters, which identify at least one channel in a second circuit switched transmission line coupled to the second network element, and an IP protocol address of the second network element; and
wherein the network element is configured to indicate within said IP protocol datagram separately for each of a plurality of time slots known to at least one of said first and second network elements, whether the IP protocol datagram carries data belonging to a channel corresponding to the time slot, and when it is indicated that the IP protocol datagram does not carry data belonging to a channel, the second circuit switched packet network element enables the reception of data to that channel from other sources from an IP-network in a non-consecutive manner.

15. The network element according to claim 14, wherein the network element comprises a compressed speech parameter extraction unit for extracting compressed speech parameters from at least one signal from the first circuit switched transmission line, said at least one signal comprising an uncompressed speech signal part and compressed speech parameters.

16. The network element according to claim 14, wherein the network element comprises a compression unit for compressing a signal of at least one channel of the first circuit switched transmission line before transmission over the data transmission network.

17. The network element according to claim 14, wherein the network element is configured to insert status information into the IP protocol packet.

18. The network element according to claim 14, wherein the network element is configured to determine said IP protocol address based at least partly on a time slot number that at least one of said first and second network nodes knows is associated with data which is transferred in the IP protocol datagram.

19. The network element according to claim 14, wherein the network element is configured to insert a number of samples from said at least one channel of said first transmission line into a payload portion of said IP protocol datagram.

20. A method, comprising:
receiving data over a data transmission network, said data coming from a first circuit switched transmission line through a first circuit switched network node, at a second circuit switched network node that is coupled to a second circuit switched transmission line;

employing, in the data transmission network, an IP protocol for transmissions from said first circuit switched network node to said second circuit switched network node, said data originating from said first circuit switched transmission line and being destined for transmission into said second circuit switched transmission line;

using an IP protocol datagram to receive data transmitted from the first circuit switched transmission line at the second network node;

reading a header from said IP protocol datagram, said header being based at least partly on circuit switched channel identifying parameters, which identify at least one channel in the second circuit switched transmission line, and an IP protocol address of the second network node; and reading from said IP protocol datagram an indication separately for each of a plurality of time slots known to at least one of said first and second circuit switched network nodes, whether the IP protocol datagram carries data belonging to a channel corresponding to the time slot, and when it is indicated that the IP protocol datagram does not carry data belonging to the channel, the second circuit switched network node enables the reception of data to that channel from other sources from an IP-network in a nonconsecutive manner.

21. The method according to claim 20, wherein compressed speech parameters received from the first network node are decompressed into an uncompressed speech signal before transmission into the second circuit switched transmission line.

22. The method of claim 20, wherein the method comprises receiving data of different time slots of a single PCM trunk line from different packet network gateways.

23. The method of claim 20, wherein a destination packet network gateway acts as said second circuit switched network node and receives data destined to a group of channels in the second circuit switched transmission line from another packet network gateway.

24. The method of claim 20, wherein said second circuit switched network node receives data destined to individual channels in the second circuit switched transmission line separately from one or more other sources, such as IP telephones.

25. A second network element, comprising:
a first connection for connecting to a data transmission network employing an IP protocol,
a second connection for connecting to a second circuit switched transmission line, and
a hardware processor configured to implement an IP protocol address reading unit for reading IP protocol addresses from IP protocol datagrams received over said data transmission network from a first network element;
wherein said IP protocol address reading unit is configured to read a header from an IP protocol datagram based at least partly on circuit switched channel identifying parameters, which identify at least one channel in the second circuit switched transmission line coupled to the second network element, and an IP protocol address of the second network element; and
wherein the network element is configured to read from said IP protocol datagram an indication separately for each of a plurality of time slots known to at least one of said first and second network elements, whether the IP protocol datagram carries data belonging to a channel corresponding to the time slot, and when it is indicated that the IP protocol datagram does not carry data belonging to a channel, the second circuit switched packet network element enables the reception of data to that channel from other sources from an IP-network in a non-consecutive manner.

* * * * *